United States Patent
Nishino et al.

[11] Patent Number: 4,932,857
[45] Date of Patent: Jun. 12, 1990

[54] COMPRESSION MOLDING APPARATUS

[75] Inventors: Kenichi Nishino, Ibaraki; Nobuyuki Nakagawa, Toyono; Hiroshi Maekawa, Hirakata, all of Japan

[73] Assignee: Takeda Chemical Industries, Ltd., Osaka, Japan

[21] Appl. No.: 310,675

[22] Filed: Feb. 14, 1989

Related U.S. Application Data

[63] Continuation-in-part of Ser. No. 203,151, Jun. 6, 1988, abandoned.

[30] Foreign Application Priority Data

Jun. 5, 1987 [JP] Japan ................... 62-141807

[51] Int. Cl.$^5$ ............................... B29C 43/02
[52] U.S. Cl. .................... 425/394; 425/395; 425/406; 425/408; 425/806
[58] Field of Search ............ 425/394, 395, 406, 408, 425/806, 806 R, DIG. 51

[56] References Cited

U.S. PATENT DOCUMENTS

| | | | |
|---|---|---|---|
| 1,680,823 | 8/1928 | Teed | 425/806 R |
| 3,089,189 | 5/1963 | Feldman et al. | 425/406 |
| 3,529,321 | 9/1970 | Culand | 425/406 |
| 3,799,720 | 3/1974 | Fjellman | 425/406 |
| 3,840,239 | 10/1974 | Fazekas et al. | 277/235 R |
| 3,951,580 | 4/1976 | Hobson | 425/395 |
| 4,474,942 | 10/1984 | Sano et al. | 528/363 |
| 4,488,862 | 12/1984 | Epel et al. | 425/405.1 |
| 4,579,937 | 4/1986 | Masuda et al. | 528/363 |
| 4,751,029 | 6/1988 | Swanson | 425/394 |
| 4,775,312 | 10/1988 | Werz et al. | 425/394 |

FOREIGN PATENT DOCUMENTS

| | | | |
|---|---|---|---|
| 117256 | 9/1984 | European Pat. Off. | 425/408 |
| 418611 | 9/1925 | Fed. Rep. of Germany | 425/395 |

Primary Examiner—Jay H. Woo
Assistant Examiner—C. Scott Bushey
Attorney, Agent, or Firm—Wenderoth, Lind & Ponack

[57] ABSTRACT

An apparatus for compression-molding plastic without producing flashes. The apparartus basically consists of a pair of dies complementary to each other, one being stationary and the other being movable so as to be capable of engaging the stationary one. The apparatus has substantially no clearance at a pinch-off section formed by the engaging edge portions of the two dies, and at least one of the engaging edge portions is made of plastic. In one embodiment of the invention both the engaging edge portions are made of plastic.

4 Claims, 2 Drawing Sheets

COMPRESSION MOLDING APPARATUS

This application is a C-I-P of U.S. patent application Ser. No. 203,151 filed June 6, 1988 and now abandoned.

BACKGROUND OF THE INVENTION

1. Field of the Invention

The present invention relates to apparatus for and a method of compression-molding plastic, and more particularly to apparatus for and a method of compression-molding a sheet molding compound (hereinafter referred to as SMC).

2. Description of the Related Art

SMC molded pieces have a beautiful appearance and exhibit excellent water resistance and chemical resistance and high mechanical strength. In addition, the SMC molded pieces are highly productive. Recently, SMC molded pieces have been used to fabricate automotive parts such as trunk lids, hoods and the like, as well as aero-parts, bath tubs, water tank panels, etc. In the applications mentioned above, the SMC is mostly compression-molded.

A mold generally includes a stationary die and a movable die, each die having an edge portion which when mated form a pinch-off section of the apparatus. These dies are made of steel, and a clearance of 0.01 to 0.10 mm is formed at the pinch-off section. After a predetermined amount of an SMC has been supplied, the SMC is compressionmolded under a pressure of 30 to 150 kgf/cm$^2$ at 120° to 180° C. At this time, the SMC partially flows out through the clearance at the pinch-off section to the outside of the dies, thus forming flashes. The flashes which are unnecessary portions of the molded pieces, are removed by suitable means after compression molding. Such flash removal requires extra labor and time, lowering the productivity of the compression molding process. When the molded pieces are to be taken out from the mold, the flashes remain stuck to the apparatus at the pinch-off section, particularly when the molded pieces are thin at the end portions thereof, and as a result, the molded pieces are pulled by the flashes which still stick to the dies. This may cause the end portions of the molded pieces to be damaged, resulting in a defective product. This contributes to a loss in productivity.

Molded pieces to be used as automotive parts are mostly painted. Pinholes, porosities and the like in the molded pieces are exposed at those portions of the molded pieces from which flashes have been removed. This produces pinholes, craters and the like on the coated films, causing the appearance of the molded pieces to be considerably unsightly.

To prevent flashes from being produced, it is necessary to make as small as possible the clearance at the pinch-off section. However, if the clearance is too small in a steel die in which the edge portions forming the pinch-off section are steel, the edge portions interfere with each other due to, for example, unequal thermal expansion of the dies. This involves the likelihood of the edge portions becoming partially damaged. Thus, the clearance cannot be made small enough to prevent flashes from being produced.

SUMMARY OF THE INVENTION

It is an object of the present invention to provide a compression molding apparatus having substantially no clearance at the pinch-off section formed by the stationary and movable dies.

It is another object of the present invention to provide a compression molding apparatus for making molded pieces with no flashes remaining at the edges thereof.

The compression molding apparatus in accordance with the present invention includes a first die provided at the outer periphery thereof with a first edge portion, and a second die provided at the outer periphery thereof with a second edge portion, the first and second edge portions being adapted to engage each other to form a pinch-off section, the first and second dies forming a pair of complementary dies, and is characterized in that at least one of the first and second edge portions is formed by plastic.

The compression molding method in accordance with the present invention is characterized in that a sheet molding compound is compression-molded with the use of the compression molding apparatus having the first and second dies mentioned above.

The die edge portion referred to herein includes a ridge and a lateral side of a die which comes in contact with the other die or edge portion thereof.

In the compression molding apparatus of the present invention, plastic is used for at least one of the edge portions forming the pinch-off section. Such plastic material includes thermosetting resin and thermoplastic resin having sufficient strength to withstand molding pressure at a molding temperature, or having resistance to high temperatures of 140° C. to 150° C. or more. The thermosetting resin includes Bakelite, epoxy resin, phenolic resin, melamine resin, polyurethane resin, thermosetting polyester amide (CP resin) and the like. The thermoplastic resin includes polytetrafluoroethylene, polytrifluorethylene and the like. Preferable is a thermosetting resin having a flexural modulus of not less than 50 kgf/mm$^2$ at 140° C.; an epoxy resin and thermosetting polyester amide (e.g., CP resin manufactured by Takeda Chemical Industries Ltd.; see U.S. Pat. Nos. 4,474,942 and 4,579,937 and copending application Ser. No. 111,513) are particularly preferred.

Fillers or reinforcing fibers may be added to the above-mentioned plastic to improve the hardness and strength of the edge portion or portions, or Teflon powder may be added to the plastic material to improve the lubricating property of the edge portion. To decrease the stickiness of flashes, the edge portion or portions made of plastic may be coated with silicone resin or Teflon, or may be plated with metal.

If the steel edge portion and the plastic edge portion interfere with each other, the plastic edge portion is unilaterally scraped off. This results in both of the edge portions being free from dragging which might occur if both edge portions were made of steel. Further, the plastic exhibits resiliency that is superior to that of metal and has a greater Poisson's ratio. Accordingly, when the pressure in the mold is increased, the edge portion made of plastic is deformed to close the small clearance at the pinch-off section causing the clearance to become substantially zero. This is one of the important characteristics of the present invention.

If the plastic edge portion is worn during use to increase the clearance at the pinch-off section, the plastic edge portion may be immediately replaced so that the clearance is sufficiently small.

DETAILED DESCRIPTION OF THE PREFERRED EMBODIMENTS

Figure 1:
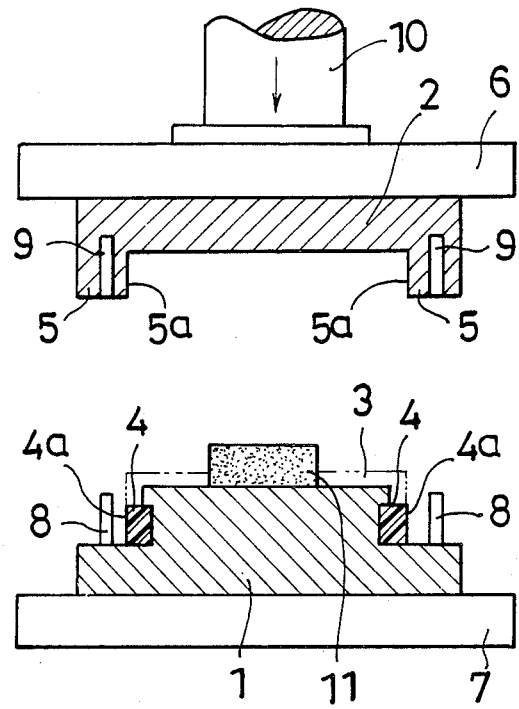
FIG. 1 is a vertical sectional view of a compression molding apparatus in accordance with a first embodiment of the present invention, illustrating the state before an SMC is compressed.

The compression molding apparatus in accordance with a first embodiment of the present invention will be described with reference to FIG. 1.

The compression molding apparatus includes a stationary die 1 and a movable die 2 which form a pair of complementary dies. When the movable die 2 is lowered to provide a compression molding state, a mold cavity 3 having a predetermined shape is formed as shown by the chained lines. The stationary die 1 is provided in the vicinity of the mold cavity 3 with a plastic edge member 4. The outer surface and the ridge of the upper end of this edge member 4 define a stationary edge portion 4a. The movable die 2 is provided in the vicinity of the mold cavity 3 with a projection 5. The inner surface and the ridge of the lower end of the projection 5 define a movable edge portion 5a. The stationary edge portion 4a and the movable edge portion 5a have a substantially complementary configuration to jointly form a pinch-off section.

The stationary die 1 is attached to a press bottom platen 7, while the movable die 2 is attached to a press top platen 6 which is driven by a driving means such as a press ram 10. The stationary die 1 is provided at the outer periphery thereof with guide pins 8, while the movable die 2 is provided with guide pin holes 9. These guide pins 8 and guide pin holes 9 are adapted to mate for positioning both dies 1 and 2.

The edge member 4 is formed by fastening a thermosetting resin molding having a predetermined square or rectangular cross section around the stationary die 1. To ensure sufficient strength, the height and width of the edge member generally range from about 1 to 10 cm in accordance with the size and shape of the product to be molded.

Figure 5:
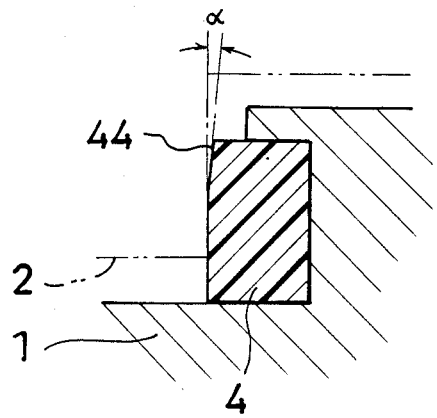
FIG. 5 is an enlarged sectional view of another example of a plastic edge member.

Further, as shown in FIG. 5, the plastic edge member 4 may have a surface 44 defining a small angle α from the ridge of the plastic edge member 4 to the lateral side thereof. According to tests conducted by the inventors, no flashes were produced with the inclination angle α in a range from 1.5° to 2° because of the ability of the plastic edge to deform as discussed above.

The plastic edge member 4 may be attached to the die body by mechanical means such as screws, bolts and the like, or by adhesives. Alternatively, the die body may be directly provided with the plastic edge member formed by direct casting, painting, compressing molding, injection molding or the like.

When an SMC or the like is molded with the use of the apparatus of the present invention, there are instances where air is accumulated in molded pieces having a complicated shape because no flashes are produced. In such a case, a so-called vacuum assisted compression molding method may be performed in which an SMC is compressed after the mold cavity has been evacuated.

Figure 3:
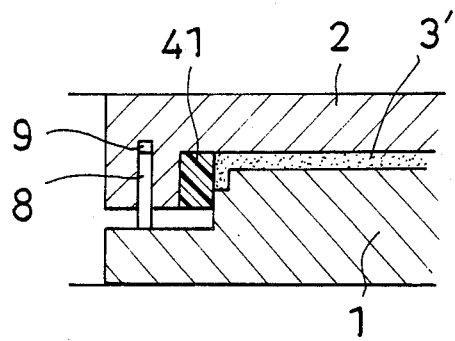
FIG. 3 is a vertical sectional view of a compression molding apparatus in accordance with a second embodiment of the present invention, illustrating the state where SMC compression is completed.

FIG. 3 shows the compression molding apparatus in accordance with a second embodiment of the present invention. In this embodiment, a plastic edge member 41 is attached to a movable die 2, while the edge member of a stationary die 1 is made of the same material as that of the die 1.

Figure 4:
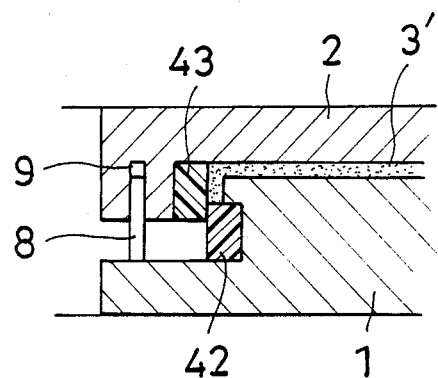
FIG. 4 is a vertical sectional view of a compression molding apparatus in accordance with a third embodiment of the present invention, illustrating the state where SMC compression is completed.

FIG. 4 shows the compression molding apparatus in accordance with a third embodiment of the present invention. In this embodiment, a plastic edge member 42 is attached to a stationary die 1, and a plastic edge member 43 is also attached to a movable die 2. Plastic materials having different hardnesses or resiliencies may be used for the plastic edge members 42 and 43, respectively.

The following description explains the compression molding method in accordance with the present invention.

Figure 2:
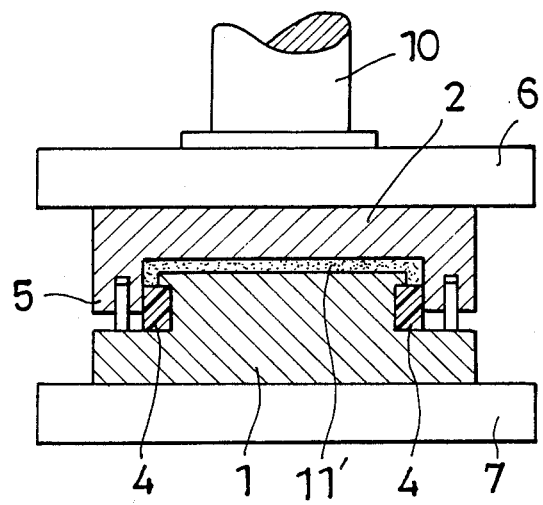
FIG. 2 is a vertical sectional view of the apparatus in FIG. 1, illustrating the state where SMC compression is completed.

First, a predetermined amount of SMC 11 is placed, as is shown in FIG. 1, on the stationary die 1 with the movable die 2 maintained in a position located upwardly of the stationary die 1. Next, the movable die 2 is lowered, i.e. moved toward the stationary die 1 compressing the SMC 11 between both the dies 1 and 2. During compression, the SMC 11 is deformed into the shape defined by the chained lines in FIG. 1. After the SMC 11 has been completely deformed, as shown in FIG. 2, so that a space between both the dies is completely filled with the deformed SMC 11', both the dies 1 and 2 continue to compress the SMC 11' for a predetermined period of time. Throughout the entire process of compressing the SMC, both the dies are kept at a predetermined conventional molding temperature between 120° C. to 180° C. to cause a chemical reaction to take place in the SMC. After the predetermined period of time has passed, the movable die 2 is lifted up so that the deformed SMC 11' may be removed from the dies as a molded product.

Examples of the compression molding in accordance with the present invention will be explained below.

EXAMPLE 1

With the use of an SMC for fabricating automotive exterior body panels, compression molding was carried out under the following conditions:

| | |
|---|---|
| Molded piece dimensions: | 300 × 300 × 2.5 mm |
| Molded piece weight: | 440 grs. |
| Stationary die edge portion material: | Thermosetting polyester amide (CP resin) which has a flexural modulus of 240 kgf/mm² at 140° C. |
| Mold temperature: | 145° C. |
| Closing speed: | 2 mm/second |
| Molding pressure: | 100 kgf/cm² |
| Pressure holding time: | 120 seconds |

Molded pieces free from flashes were obtained.

EXAMPLE 2

With the use of a pigmented SMC, a parabolic antenna dish having a diameter of 40 cm was molded under the following conditions:

| | |
|---|---|
| Molded piece dimensions: | Diameter 40 cm × Average thickness of 3.5 mm |
| Molded piece weight: | 1,050 grs. |
| Stationary die edge portion material: | Thermosetting polyester amide (CP resin) which has a flexural modulus of 240 kgf/mm$^2$ at 140° C. |
| Upper and lower die temperatures: | 150° C. and 142° C. respectively |
| Closing speed: | 1.0 mm/second |
| Molding pressure: | 80 kgf/cm$^2$ |
| Pressure holding time: | 150 seconds |

Molded pieces free from flashes were obtained.

What is claimed is:

1. A compression molding apparatus comprising:
   a first die defining an inner edge portion; and
   a second die defining an outer edge portion having a configuration substantially complementary to that of the inner edge portion of said first die,
   said dies collectively defining a mold cavity having a shape corresponding to that of an article to be molded,
   at least one of said inner and said outer edge portions comprising thermosetting resin having a flexural modulus of at least 50 kgf/mm$^2$ at 140° C.,
   said dies movable in the apparatus relative to one another between a first position at which said dies are spaced apart from one another and a second position at which the inner edge portion defined by said first die mates with the outer edge portion of said second die in the apparatus with substantially no clearance therebetween, and
   said inner and outer edge portions of said dies, when in said second position, constituting a pinch-off section of the apparatus at which said mold cavity terminates.

2. A compression molding apparatus as claimed in claim 1,
   wherein each of said edge portions comprises thermosetting resin have a flexural modulus of at least 50 kgf/mm$^2$ at 140° C.

3. A compression molding apparatus as claimed in claim 1,
   wherein said resin is a thermosetting polyester amide having a flexural modulus of 240 kgf/mm$^2$ at 140° C.

4. A compression molding apparatus as claimed in claim 1,
   wherein only one of said inner and said outer edge portions comprises said thermosetting resin,
   said one of said edge portions made up of a first surface disposed in a plane extending generally parallel to the direction in which said dies are movable relative to one another, and a second surface inclined from said first surface and terminating at a ridge,
   an angle in the range of 1.5° to 2° being defined between said plane and said ridge.

* * * * *